No. 702,859. Patented June 17, 1902.
H. HOWE.
LAND PULVERIZER.
(Application filed July 17, 1901.)
(No Model.) 4 Sheets—Sheet 1.
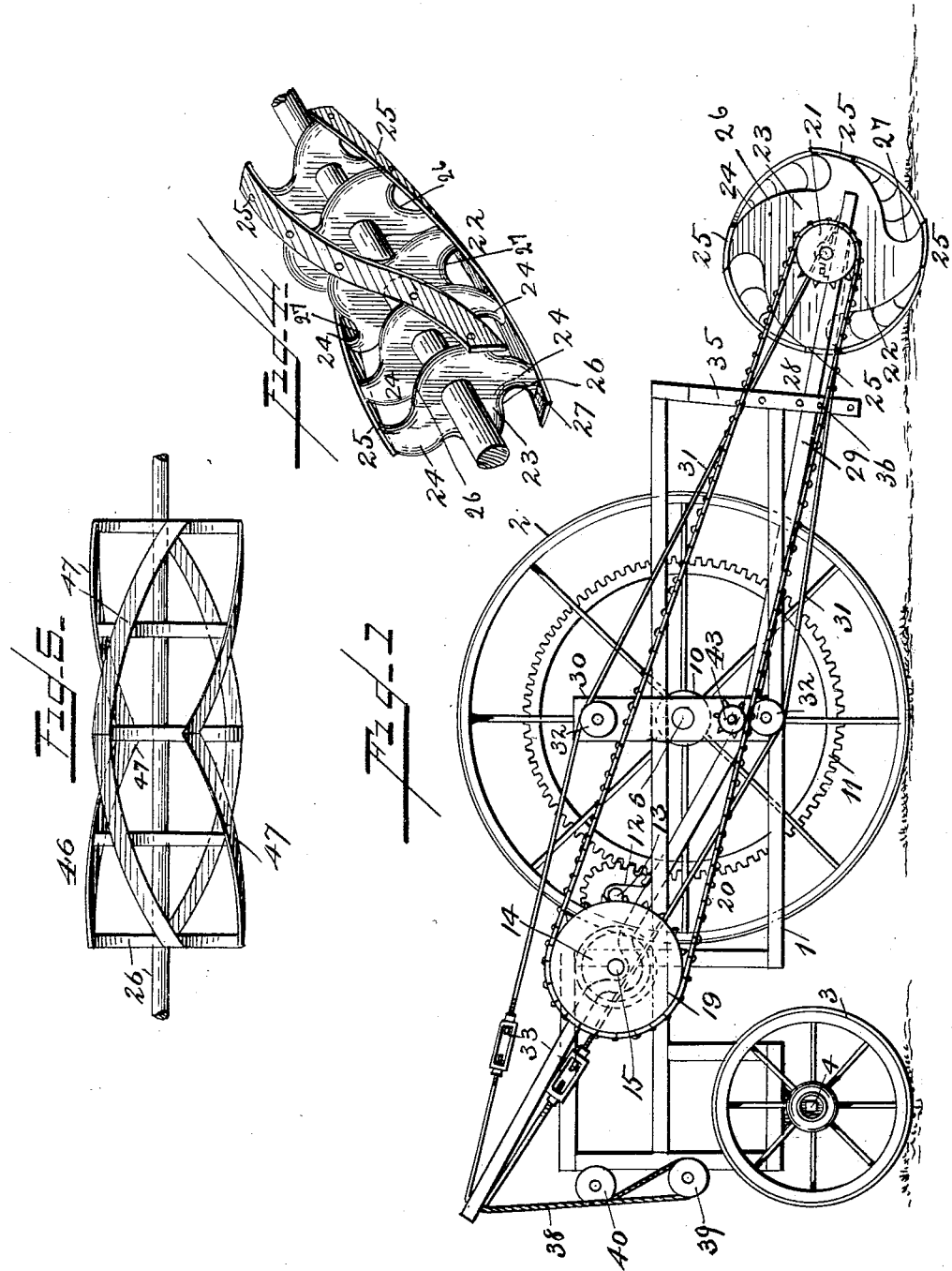
Witnesses:
Franck L. Ourand.
Frank G. Radelfinger.
Inventor:
Hezekiah Howe.
by Louis Bagger & Co.,
Attorneys.

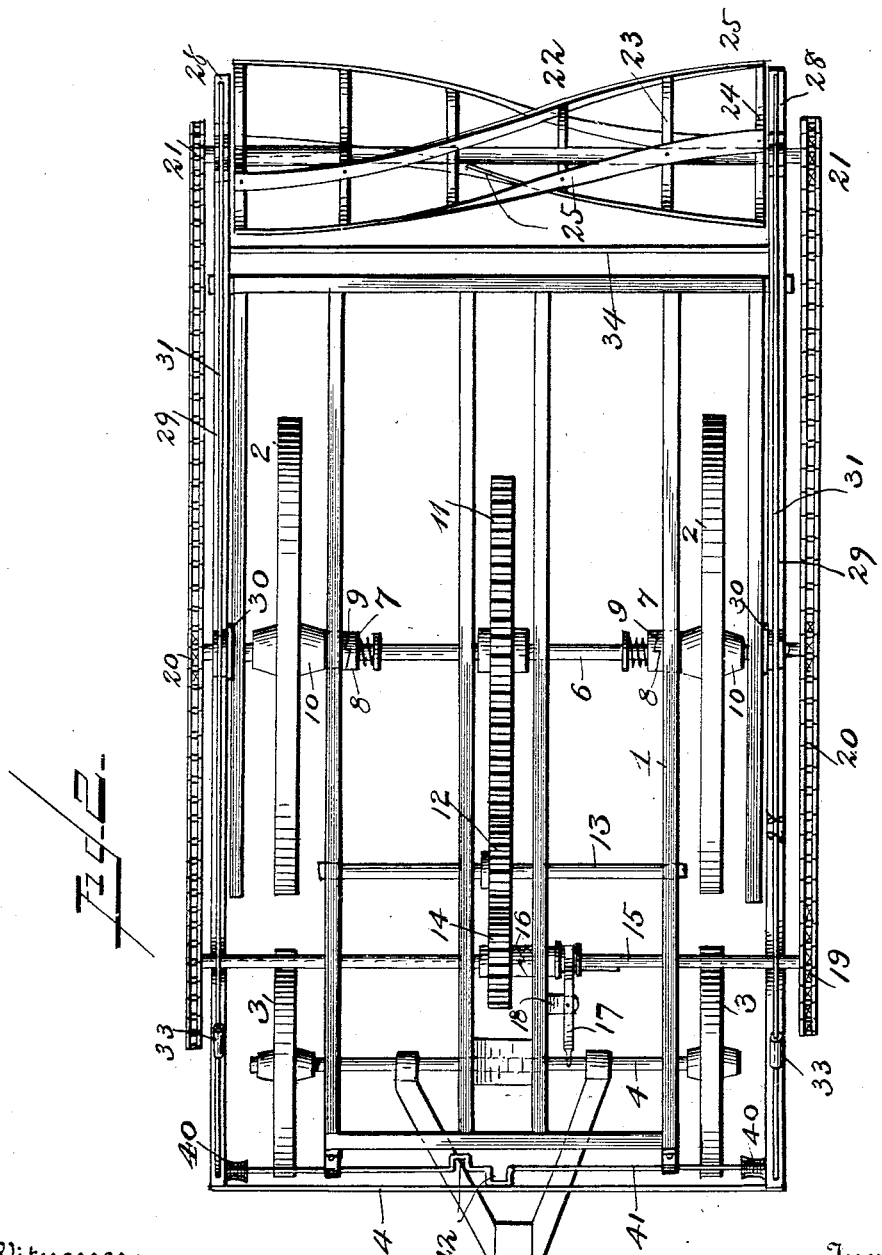

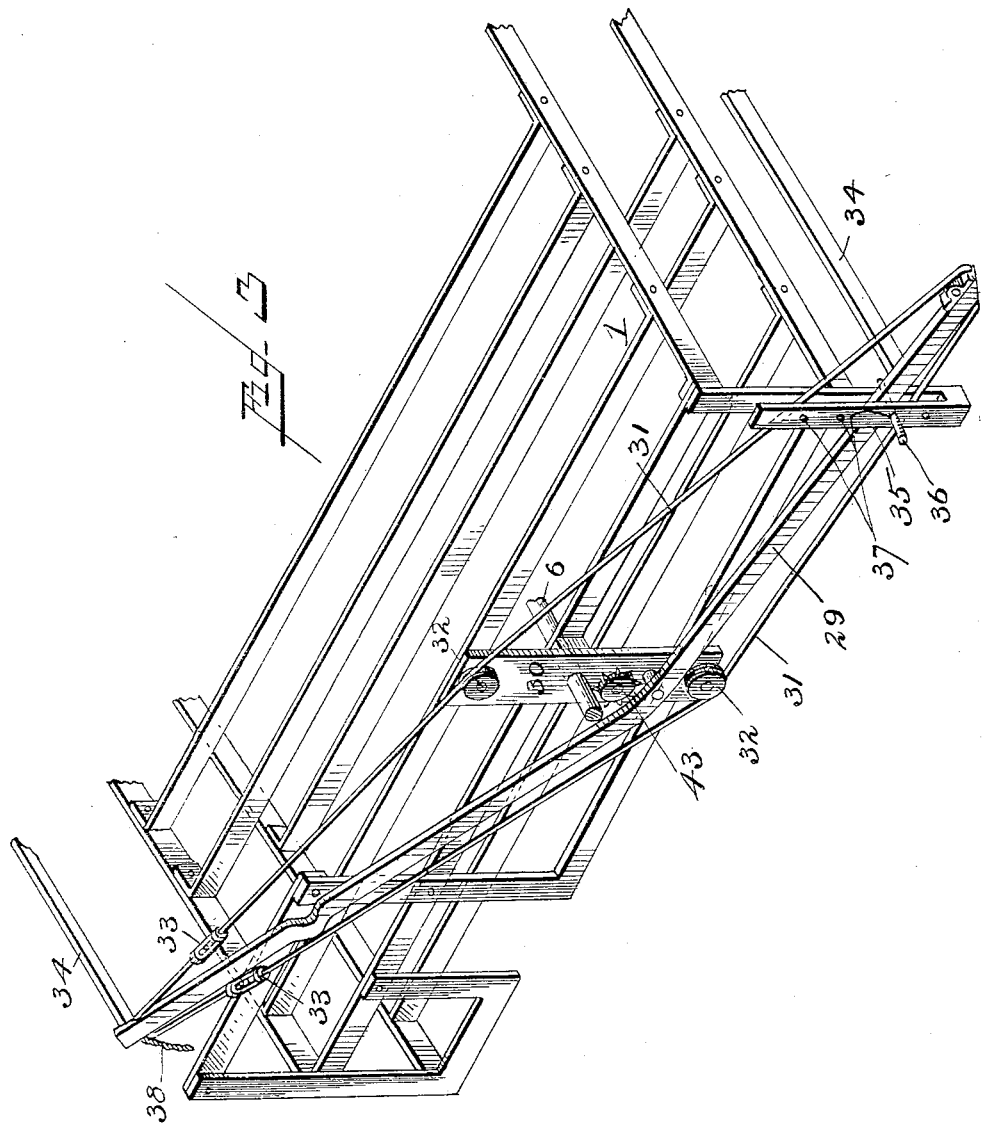

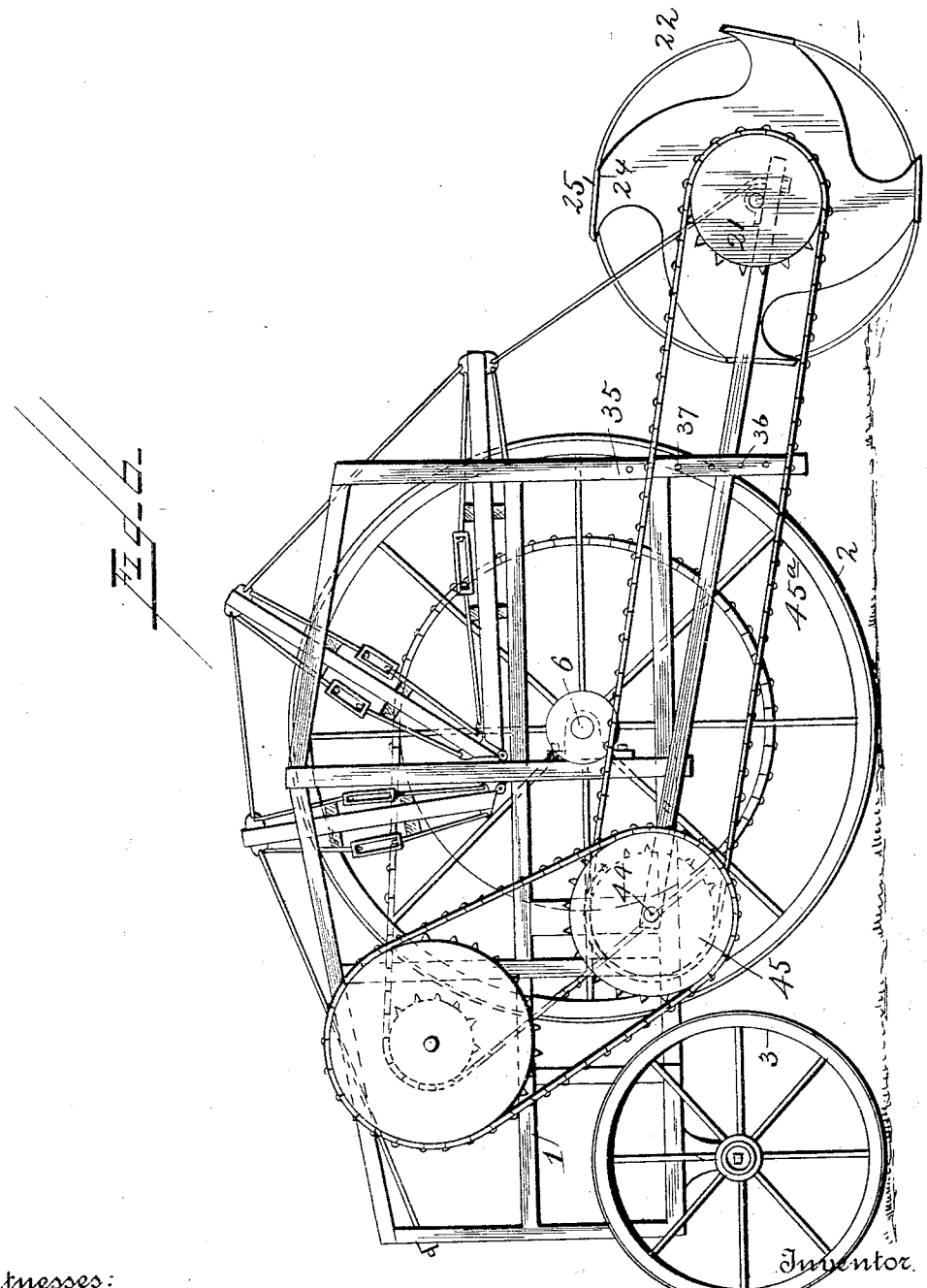

UNITED STATES PATENT OFFICE.

HEZEKIAH HOWE, OF OLEAN, NEW YORK.

LAND-PULVERIZER.

SPECIFICATION forming part of Letters Patent No. 702,859, dated June 17, 1902.

Application filed July 17, 1901. Serial No. 68,656. (No model.)

*To all whom it may concern:*

Be it known that I, HEZEKIAH HOWE, a citizen of the United States, residing at Olean, in the county of Cattaraugus and State of New York, have invented new and useful Improvements in Land-Pulverizers, of which the following is a specification.

My invention relates to land-pulverizers, and has for one object to construct a machine provided with means for raising the pulverizer-drum clear of the ground when not in operation and to throw it out of gear.

Another object is to construct an improved form of drum the knives of which will make a shearing cut, thus enabling it to operate in weedy ground, and which will take up and sift the ground, thereby plowing it and breaking the clods.

The simple and novel construction by which these objects are accomplished is fully described and claimed in this specification and illustrated in the accompanying drawings, forming a part thereof, in which—

Figure 1 is a side elevation of my machine. Fig. 2 is a plan view of the same. Fig. 3 is a perspective showing a truss member and the skeleton framework. Fig. 4 is a perspective of the pulverizing-drum. Fig. 5 shows a modified form of pulverizer-drum. Fig. 6 is an elevation of my machine with a modified form of truss members.

Like numerals of reference designate like parts in the different views of the drawings.

The numeral 1 designates a suitable framework for supporting the various parts of my machine. The frame 1 is carried by four traction-wheels—two large ones 2 and two smaller ones 3, having an axles 4, to which a tongue 5 is attached. The large wheels 2 are loosely mounted on a shaft 6, but are constrained to turn therewith in one direction by spring-actuated clutches 7, provided with beveled teeth 8, which normally engage corresponding beveled teeth 9 on the hubs 10 of the wheels 2. These clutches 7 permit the wheels 2 to turn freely on the shaft 6 when backing, but compel them to turn in unison therewith in going ahead.

To provide means for driving the machinery, a large gear-wheel 11 is keyed on the shaft 6 and located to mesh with a smaller gear 12, keyed on a shaft 13, journaled in the frame 1 and parallel to the shaft 6. The gear 12 meshes with a gear 14, loose on a shaft 15, but held to revolve in unison therewith by a clutch 16, which engages its toothed hub. The clutch 16 is arranged to be operated by a lever 17, pivoted to an arm 18 and engaging the clutch 16. By this arrangement the machine may be thrown out of gear by the use of the lever 17. Sprocket-wheels 19 are keyed on the outer ends of the shaft 15 and are provided with chains 20, which extend to the rear of the machine and pass around sprockets 21, keyed on the spindles of a pulverizing-drum 22, located at the rear of the machine. The drum 22 comprises a series of parallel pulverizing-disks 23, keyed on a shaft and provided with spurs 24, which are connected by diagonally-extending knives 25. The disks 23 are rounded off to a blunt edge at 26, and the spurs are hooked and similarly rounded at 27. This construction enables them to cut through weeds and to break up hard ground. The spurs 24 on the successive disks 23 are placed slightly in advance of each other, so that the knives joining them extend spirally along the axis of the drum.

The drum 22 is supported in boxes mounted on the rear ends of two parallel truss members 28, which each consist of a longitudinal member 29, a transverse member 30, and two longitudinally-extending truss-rods 31. Sheaves 32, mounted on the transverse members 30, bear on the truss-rods 31 and hold them spread. Turn-buckles 33 serve to tighten the rods 31. The transverse members 30 are pivotally mounted on the ends of the shaft 6, beyond the traction-wheels 2. The trusses 28 are connected by transverse members 34, and thereby constrained to move in unison. Guides 35 are formed on the frame 1, and the truss members 28 fit therein. They can be secured at different heights by means of cross-pins 36, fitting apertures 37 in the guides 35. Ropes 38 are attached to the forward ends of the truss members, which ropes pass down and around sheaves 39 and up over drums 40, keyed on a shaft 41, provided with cranks 42. By means of these cranks 42 the shaft 41 can be turned, the truss members 28 pulled down, and the drum 22 raised clear of the ground. The pins 36 can then be inserted and the drum held up. To prevent the chains 20 from being slackened when the drum is raised, idlers 43 are mounted on the transverse members 30.

In operation my machine is driven into a field to be broken up and the drum 22 lowered in contact with the ground. The machine is then started, when the motion of the wheels 2 will be transmitted to the drum 22 through the medium of the gearing and sprocket chains. The knives 25 will engage the ground with a shearing cut and in combination with the spurred disks 23 will thoroughly sift and pulverize it. The large lumps will fall within the drum, where they will be ground to powder by the knives and disks. After the work has been completed the machinery can be thrown out of gear by means of the levers 17 and the drum 22 raised clear of the ground by operating the crank-shaft 41.

In the modified form shown in Fig. 6 trusses of a slightly-different form are used. These trusses are pivoted on a shaft 44, which bears a sprocket 45 for driving a chain $45^a$, which drives the drum 22. By this arrangement there is no slacking of the driving-chain when the trusses are operated to raise the drum.

In the modified form 46 of the drum illustrated by Fig. 5 the knives 47 thereon are V-shaped and diverge from the center toward the ends of the drum. These knives would also give a shearing cut and would tend to throw the ground outward from the center instead of from end to end, as in the preferred form.

I do not wish to be limited as to details of construction, as these may be modified in many particulars without departing from the spirit of my invention.

Having thus described my invention, what I claim as new, and wish to secure by Letters Patent, is—

1. A truss member comprising the combination of a transverse member constructed to be pivotally connected to a shaft and bearing two sheaves one mounted on each end thereof, a longitudinal member, and a pair of truss-rods connected at their extremes to the extremes of said longitudinal member and bearing intermediately on said sheaves, substantially as described.

2. The combination with the frame of the machine, bearing a shaft, of a pair of parallel truss members pivotally mounted on said shaft, each of said members comprising a transverse member pivoted on said shaft and bearing a sheave on each end, a longitudinal member, and a pair of truss-rods connected at their extremes to the extremes of said longitudinal member and bearing on said sheaves, a pulverizing-drum carried by said truss members, and means for adjusting said truss members at different heights, substantially as described.

3. The combination with the frame of the machine, of a shaft, of a pair of parallel truss members mounted on said shaft, each of said truss members comprising a transverse member pivoted on said shaft and bearing sheaves, a longitudinal member, and a pair of truss-rods connected at their extremes to the extremes of said longitudinal member and bearing intermediately on said sheaves, and a pulverizing-drum journaled in said longitudinal member, substantially as described.

In testimony whereof I have hereunto set my hand in presence of two subscribing witnesses.

HEZEKIAH HOWE.

Witnesses:
FRANK G. RADELFINGER,
BENNETT S. JONES.